(12) United States Patent
Geng et al.

(10) Patent No.: US 11,095,136 B2
(45) Date of Patent: Aug. 17, 2021

(54) BATTERY PACK AND CHARGING ASSEMBLY

(71) Applicant: Nanjing Chervon Industry Co., Ltd., Nanjing (CN)

(72) Inventors: Zheng Geng, Nanjing (CN); Hehan Liu, Nanjing (CN); Dezhong Yang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/060,117

(22) Filed: Oct. 1, 2020

(65) Prior Publication Data

US 2021/0021144 A1 Jan. 21, 2021

Related U.S. Application Data

(63) Continuation of application No. PCT/CN2019/078067, filed on Mar. 14, 2019.

(30) Foreign Application Priority Data

Apr. 2, 2018 (CN) .......................... 201810280320.5
Apr. 2, 2018 (CN) .......................... 201810280364.8

(51) Int. Cl.
*H02J 7/04* (2006.01)
*H02J 7/16* (2006.01)
(Continued)

(52) U.S. Cl.
CPC ..... *H02J 7/00308* (2020.01); *H01M 10/4257* (2013.01); *H01M 10/441* (2013.01);
(Continued)

(58) Field of Classification Search
CPC .. H02J 7/00308; H02J 7/0029; H02J 7/00032; H02J 7/0048; H02J 7/02;
(Continued)

(56) References Cited

U.S. PATENT DOCUMENTS

2008/0238370 A1\* 10/2008 Carrier ................ H02J 7/00047
320/134
2009/0051324 A1\* 2/2009 Nakatsuji .............. H02J 7/0021
320/134
(Continued)

FOREIGN PATENT DOCUMENTS

CN 101916983 A 12/2010
CN 101969214 A 2/2011

OTHER PUBLICATIONS

ISA/CN, Int. Search Report issued on PCT patent application No. PCT/CN2019/078067, dated Jun. 4, 2019, 2 pages.

*Primary Examiner* — Zixuan Zhou

(74) *Attorney, Agent, or Firm* — Greenberg Traurig, LLP

(57) ABSTRACT

A battery pack is detachably connectable to an electric tool or a charger and includes a housing, a cell group, a first voltage monitoring module, a control module, a second voltage monitoring module and a protection module. The cell group includes a plurality of cells electrically connected to each other. The first voltage monitoring module monitors at least one of the voltage of each cell or the total voltage of the cell group. The second voltage monitoring module monitors the voltage of each cell to detect whether the cells are in an overvoltage state. The protection module is electrically connected to the second voltage monitoring module and when the second voltage monitoring module monitors that any one of the cells is in the overvoltage state, cuts off a charging path formed between the battery pack and the charger.

4 Claims, 6 Drawing Sheets

(51) Int. Cl.
*H02J 7/00* (2006.01)
*H01M 10/42* (2006.01)
*H01M 10/44* (2006.01)
*H01M 10/48* (2006.01)
*H02J 7/02* (2016.01)

(52) U.S. Cl.
CPC ......... *H01M 10/482* (2013.01); *H02J 7/0013* (2013.01); *H02J 7/0029* (2013.01); *H02J 7/00032* (2020.01); *H02J 7/0047* (2013.01); *H02J 7/0048* (2020.01); *H02J 7/02* (2013.01); *H01M 2010/4271* (2013.01); *H01M 2220/30* (2013.01); *H02J 7/00302* (2020.01)

(58) Field of Classification Search
CPC .. H02J 7/0013; H01M 10/441; H01M 10/482; H01M 10/4257; H01M 2010/4271; H01M 2220/30
USPC .................................................. 320/116, 162
See application file for complete search history.

(56) References Cited

U.S. PATENT DOCUMENTS

2014/0103876 A1* 4/2014 Kim ...................... H02J 7/0014
320/112
2019/0157896 A1* 5/2019 Cha ................... H02J 7/007192

\* cited by examiner

BATTERY PACK AND CHARGING ASSEMBLY

RELATED APPLICATION INFORMATION

The present application is a continuation of International Application Number PCT/CN2019/078067, filed on Mar. 14, 2019, the disclosure of which is incorporated herein by reference in its entirety. Further, this application claims the priority of Chinese Patent Application No. 201810280364.8, filed on Apr. 2, 2018 and Chinese Patent application number 201810280320.5, filed on Apr. 2, 2018 in the SIPO (State Intellectual Property Office—Chinese Patent Office), the disclosures of which are incorporated herein in their entirety by reference.

TECHNICAL FIELD

The disclosure relates to a battery pack and a charging assembly and, in particular, to a battery pack having good safety performance during charging and a charging assembly including the battery pack.

BACKGROUND

As power of an electric tool is required to be increasingly great, a battery pack as an energy source for a direct-current electric tool is required to output an increasingly high voltage.

However, an increasingly high output voltage means an increasingly high probability of fault in cells in the battery pack. Therefore, it is required to take protective measures to solve possible faults (such as an overcharge and an imbalance between the cells) of the battery pack so as to prevent damage to internal or external components of the battery pack.

SUMMARY

To solve the shortcomings of the existing art, the object of the disclosure is to provide a battery pack having good safety performance during charging and a charging assembly including the battery pack.

To achieve the object, the disclosure adopts the technical solution below.

Provided is a battery pack. The battery pack is detachably connected to an electric tool or a charger. The battery pack includes a housing, a cell group, a first voltage monitoring module, a control module, a second voltage monitoring module and a protection module. The cell group includes a plurality of cells electrically connected to each other. The cell group is disposed in the housing. The first voltage monitoring module is configured to monitor at least one of a voltage of each cell or a total voltage of the cell group. The control module is electrically connected to the first voltage monitoring module and configured to control a charging process of the cell group. The second voltage monitoring module is configured to monitor the voltage of each cell to detect whether the cells are in an overvoltage state. The protection module is electrically connected to the second voltage monitoring module and configured to, when the second voltage monitoring module monitors that any one of the cells is in the overvoltage state, cut off a charging path formed between the battery pack and the charger.

Further, the battery pack may include a positive terminal electrically connected to an anode of the cell group. The protection module is connected in series between the second voltage monitoring module and the positive terminal, and the protection module is configured to, when the second voltage monitoring module monitors that any one of the cells is in the overvoltage state, cut off an electrical connection between the cell group and the positive terminal.

Further, the battery pack may include a negative terminal, electrically connected to a cathode of the cell group. The protection module is connected in series between the second voltage monitoring module and the negative terminal, and the protection module is configured to, when the second voltage monitoring module monitors that any one of the cells is in the overvoltage state, cut off an electrical connection between the cell group and the negative terminal.

Further, the battery pack may include a power module electrically connected to the cell group and the control module and configured to convert electrical energy of the cell group to electrical energy for the control module to use. The protection module is connected in series between the second monitoring module and the power module, and the protection module is configured to, when the second voltage monitoring module monitors that any one of the cells is in the overvoltage state, cut off an electrical connection between the cell group and the power module.

Further, the protection module may include an electronic switch and a control unit. The electronic switch is electrically connected to the positive terminal of the battery pack. The control unit is electrically connected to the electronic switch and the second voltage monitoring module and configured to, when the second voltage monitoring module monitors that any one of the cells is in the overvoltage state, control the electronic switch to turn off to cut off the electrical connection between the cell group and the positive terminal.

Further, the protection module may include an electronic switch and a control unit. The electronic switch is electrically connected to the negative terminal of the battery pack. The control unit is electrically connected to the electronic switch and the second voltage monitoring module and configured to, when the second voltage monitoring module monitors that any one of the cells is in the overvoltage state, control the electronic switch to turn off to cut off the electrical connection between the cell group and the negative terminal.

Further, the protection module may include an electronic switch and a control unit. The electronic switch is electrically connected to the power module. The control unit is electrically connected to the electronic switch and the second voltage monitoring module and configured to, when the second voltage monitoring module monitors that any one of the cells is in the overvoltage state, control the electronic switch to turn off to cut off the electrical connection between the cell group and the power module.

Further, the protection module may include a fuse, an electronic switch and a control unit. The fuse is electrically connected to the cell group. The electronic switch is connected in series to the fuse and the cell group. The control unit is electrically connected to the second voltage monitoring module and the electronic switch and configured to, when the second voltage monitoring module monitors that any one of the cells is in the overvoltage state, control the electronic switch to turn on to blow the fuse.

Further, the protection module may include a fuse, an electronic switch and an optical coupler. The fuse is electrically connected to the cell group. The electronic switch is connected in series to the fuse and the cell group. The optical coupler is electrically connected to the second voltage monitoring module and the electronic switch and configured to control the electronic switch to turn on to blow the fuse according to a signal of the second voltage monitoring module.

Further, the battery pack may include a communication terminal configured to at least transmit a signal of the battery pack to the charger or the electric tool. The protection module is connected in series between the second voltage monitoring module and the communication terminal and configured to, when the second voltage monitoring module monitors that any one of the cells is in the overvoltage state, send the signal to the charger through the communication terminal to generate, in the charger, a signal for stopping a charging current from flowing to the battery pack.

Further, the protection module may include an electronic switch and a temperature sensor. The electronic switch is electrically connected to the second voltage monitoring module. The temperature sensor is connected in series between the electronic switch and the communication terminal. The electronic switch is configured to, when the second monitoring module monitors that any one of the cells is in the overvoltage state, cut off a conductive path of the temperature sensor.

Further, when a monitored voltage of at least one of the cells is greater than or equal to a first preset voltage, the first voltage monitoring module may determine that the cells are in the overvoltage state. When the monitored voltage of at least one of the cells is greater than or equal to a second preset voltage, the second voltage monitoring module may determine that the cells are in an overvoltage state. The second preset voltage is greater than the first preset voltage.

In a further example, provided is a charging assembly, including a battery pack and a charger. The battery pack includes a housing, a cell group, a first voltage monitoring module, a control module, a second voltage monitoring module and a protection module. The cell group includes a plurality of cells electrically connected to each other. The cell group is disposed in the housing. The first voltage monitoring module is configured to monitor at least one of a voltage of each cell or a total voltage of the cell group. The control module is electrically connected to the first voltage monitoring module and configured to control a charging process of the cell group. The second voltage monitoring module is configured to monitor the voltage of each cell to detect whether the cells are in an overvoltage state. The protection module is electrically connected to the second voltage monitoring module, and the protection module is configured to, when the second voltage monitoring module monitors that any one of the cells is in the overvoltage state, cut off a charging path formed between the battery pack and the charger.

Further, the battery pack may include a positive terminal electrically connected to an anode of the cell group. The protection module is connected in series between the second voltage monitoring module and the positive terminal, and the protection module is configured to, when the second voltage monitoring module monitors that any one of the cells is in the overvoltage state, cut off an electrical connection between the cell group and the positive terminal.

Further, the battery pack may include a negative terminal electrically connected to a cathode of the cell group. The protection module is connected in series between the second voltage monitoring module and the negative terminal, and the protection module is configured to, when the second voltage monitoring module monitors that any one of the cells is in the overvoltage state, cut off an electrical connection between the cell group and the negative terminal.

Further, the battery pack may include a power module electrically connected to the cell group and the control module. The power module is configured to convert electrical energy of the cell group to electrical energy for the control module to use. The protection module is connected in series between the second monitoring module and the power module, and the protection module is configured to, when the second voltage monitoring module monitors that any one of the cells is in the overvoltage state, cut off an electrical connection between the cell group and the power module.

Further, the protection module may include an electronic switch and a control unit. The electronic switch is electrically connected to the positive terminal of the battery pack. The control unit is electrically connected to the electronic switch and the second voltage monitoring module, and the control unit is configured to, when the second voltage monitoring module monitors that any one of the cells is in the overvoltage state, control the electronic switch to turn off to cut off the electrical connection between the cell group and the positive terminal.

Further, the protection module may include an electronic switch and a control unit. The electronic switch is electrically connected to the negative terminal of the battery pack. The control unit is electrically connected to the electronic switch and the second voltage monitoring module, and the control unit is configured to, when the second voltage monitoring module monitors that any one of the cells is in the overvoltage state, control the electronic switch to turn off to cut off the electrical connection between the cell group and the negative terminal.

Further, the protection module may include an electronic switch and a control unit. The electronic switch is electrically connected to the power module. The control unit is electrically connected to the electronic switch and the second voltage monitoring module, and the control unit is configured to, when the second voltage monitoring module monitors that any one of the cells is in the overvoltage state, control the electronic switch to turn off to cut off the electrical connection between the cell group and the power module.

Further, the protection module may include a fuse, an electronic switch and a control unit. The fuse is electrically connected to the cell group. The electronic switch is connected in series to the fuse and the cell group. The control unit is electrically connected to the second voltage monitoring module and the electronic switch and configured to control the electronic switch to turn on to blow the fuse according to a signal of the second voltage monitoring module.

Further, the battery pack may include a communication terminal configured to at least transmit a signal of the battery pack to the charger or the electric tool. The protection module is connected in series between the second voltage monitoring module and the communication terminal, and the protection module outputs a charging prohibition signal to the charger through the communication terminal when the second voltage monitoring module monitors that any one of the cells is in the overvoltage state so that the charger stops the charging current from flowing to the battery pack.

Further, the protection module may include an electronic switch and a temperature sensor. The electronic switch is electrically connected to the second voltage monitoring module. The temperature sensor is connected in series between the electronic switch and the communication terminal. The electronic switch is configured to, when the second monitoring module monitors that any one of the cells is in the overvoltage state, cut off the conductive path of the temperature sensor.

Further, the charger may include a charging communication terminal, a charging control module and a charging switch. The charging communication terminal is connectable to the communication terminal of the battery pack to receive the charging prohibition signal. The charging control module is electrically connected to the charging communication terminal. The charging switch is electrically connected to the charging control module. The charging control module is configured to output a control signal according to the received charging prohibition signal to turn off the charging switch so that the charger stops the charging current from flowing to the battery pack.

Further, the charger may include a charging positive terminal, a charging cathode electron and a charging detection terminal. The charging positive terminal is configured to be electrically connected to the positive terminal of the battery pack. The charging cathode electron is configured to be electrically connected to the negative terminal of the battery pack. The charging detection terminal is configured to be electrically connected to a detection terminal of the battery pack. The detection terminal of the battery pack is electrically connected to the cell group of the battery pack.

Further, the charger may include a voltage monitoring module. The voltage monitoring module is electrically connected to the charging detection terminal, and the voltage monitoring module is configured to detect a voltage of the battery pack through the charging detection terminal.

The disclosure has advantages of providing dual protection that helps improve the safety during charging.

DETAILED DESCRIPTION

The following is a specific description of the disclosure in conjunction with the drawings and examples.

Figure 1:
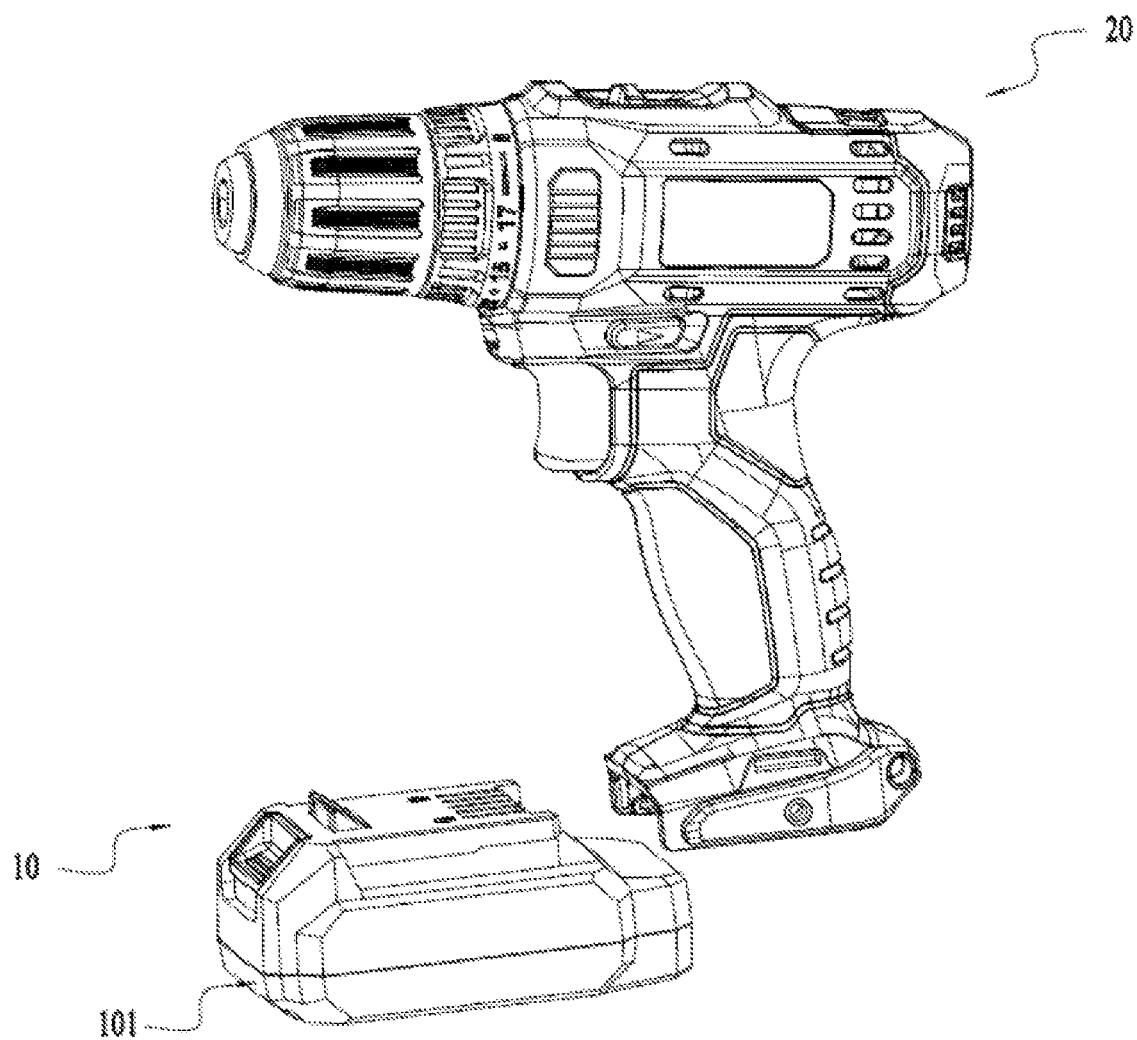
FIG. 1 is a perspective view of a battery pack and a charger.
Figure 2:
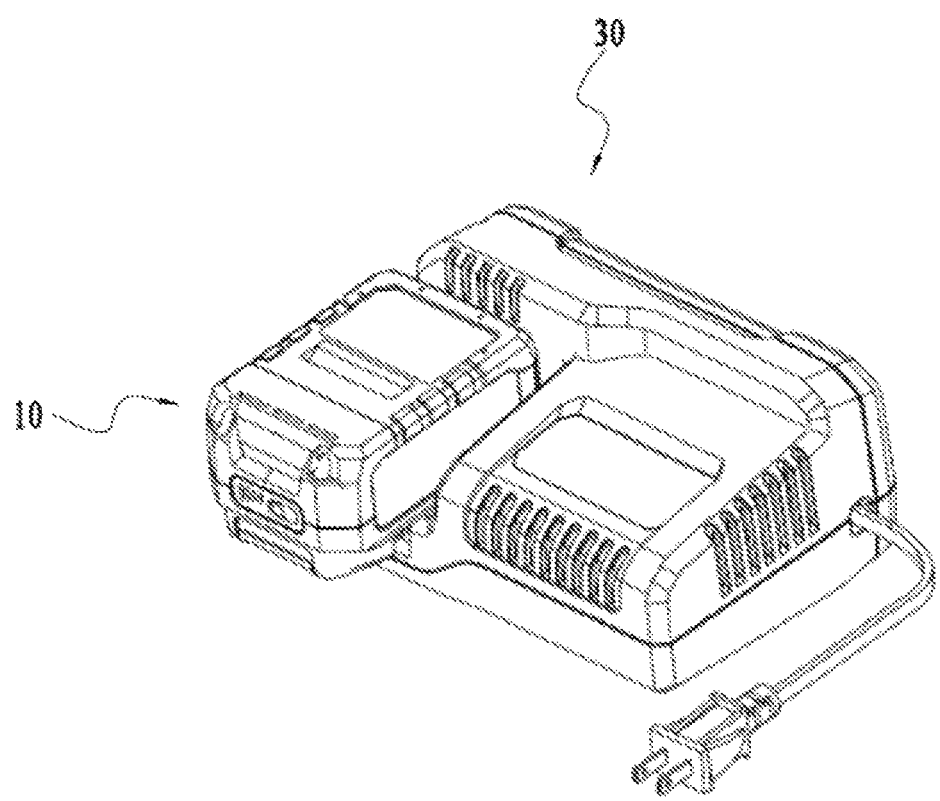
FIG. 2 is a perspective view of a battery pack and an electric tool.

Referring to FIG. 1, a battery pack 10 is detachably mounted on an electric tool 20 and can provide a direct current for the electric tool 20. Referring to FIG. 2, a battery pack 10 is detachably mounted on a charger 30, and the charger can charge the battery pack 10.

Figure 3:
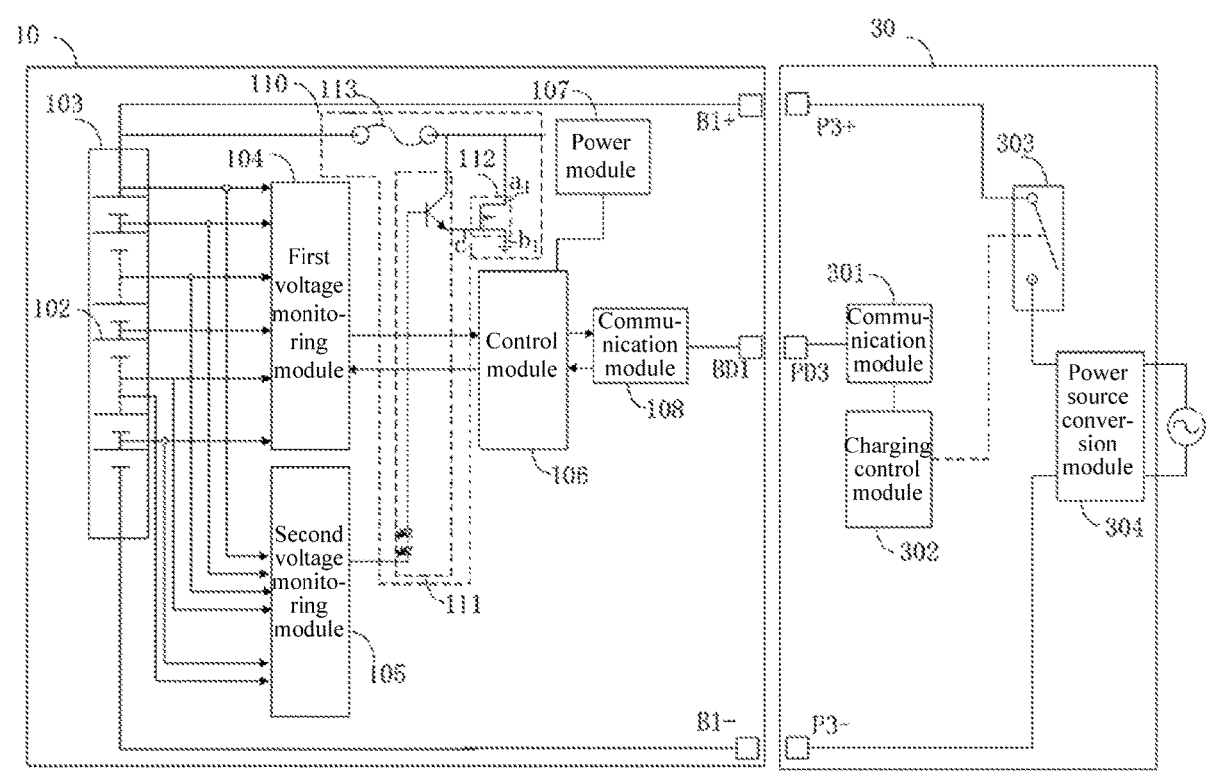
FIG. 3 illustrates circuit diagrams of the inside of a battery pack and the inside of a charger according to an example.

Referring to FIG. 3, in an example, the charger 30 includes a charging positive terminal P3+, a charging negative terminal P3−, a power source conversion module 304, a charging control module 302 and a charging switch 303. The charging positive terminal P+ and the charging negative terminal P− of the charger 30 are electrically connected to the power source conversion module 304. The power source conversion module 304 is configured to convert the electric energy of an external power source to the electric energy available for the battery pack 10. The charging switch 303 is electrically connected between the charging positive terminal P3+ and the power source conversion module 304 or between the charging negative terminal P3− and the power source conversion module 304. The charging switch 303 is configured to allow or prohibit the current from the power source conversion module 304 and the external power source according to a signal of the control module 302. The charging control module 302 is electrically connected to the charging switch 303 and configured to output a control signal to the charging switch 303 to allow or prohibit the current from the power source conversion module 304 and the external power source. For example, the external power source is an alternating-current power source.

The battery pack 10 includes a housing 101. A plurality of cells 102 are disposed inside the housing. The cells 102 are electrically connected in series or in parallel to constitute a cell group 103.

The battery pack 10 further includes power source terminals. The power source terminals include a positive terminal B1+ and a negative terminal B1−. The positive terminal B1+ is electrically connected to the anode of the cell group 103, and the negative terminal B1− is electrically connected to the cathode of the cell group 103. When the battery pack 10 is connected to the charger 30, the positive terminal B1+ of the battery pack 10 is electrically connected to the positive terminal P3+ of the charger 30, and the negative terminal B1+ of the battery pack 10 is electrically connected to the charging negative terminal P3− of the charger 30. The positive terminal B1+ and the negative terminal B1− of the battery pack 10 are electrically connected to the charging positive terminal P3+ and the charging negative terminal P3− of the charger 30 respectively such that the external power source, the charger 30 and the battery pack 10 form a charging loop.

The battery pack 10 further includes a control module 106. The control module 106 is configured to, at least during the charging period of the battery pack 10, control the charging process of the cell group 103. The control module 106 may be a dedicated chip having control functions, may be a control circuit constituted by electrical elements and having control functions or may be an electronic switch such as a field-effect transistor.

The battery pack 10 further includes a power module 107 electrically connected to the cell group 103 and the control module 106. The power module 107 is configured to convert the electrical energy of the cell group 103 to the electrical energy for the control module 106 to use.

The battery pack 10 further includes a communication module 108 electrically connected to the control module 106 of the battery pack 10. The communication module 108 is configured to be in a communicative connection with the communication module 301 of the charger 30 to transmit signals. In some examples, the communication module 108 is a communication circuit that can be in wired communicative connection with the communication module 301 of the charger 30. For example, the battery pack 10 is provided with a communication terminal BD1 electrically connected to the communication module 108, the charger 30 is correspondingly provided with a charging communication terminal PD3 connectable to the communication terminal BD1, and a communicative connection is established between the battery pack 10 and the communication module 301 of the charger 30 through the communication terminal BD1 of the battery pack 10 and the communication terminal PD3 of the charger 30. In some other examples, the communication module 108 is a wireless communication module that can be in wireless communicative connection with the communication module 301 of the charger 30.

The battery pack 10 may have a fault (such as an overcharge and an imbalance between the cells) during the process when the charger 20 charges the battery pack 10, so it is necessary to take protective measures to solve faults possible to occur within the battery pack so that damage to internal or external components of the battery pack is prevented.

Therefore, the battery pack 10 is provided with a first voltage monitoring module 104 configured to monitor at least one of the voltage of each cell 102 or the total voltage of the cell group 103. The first voltage monitoring module 104 is electrically connected to the control module 106.

Specifically, when the first voltage monitoring module 104 monitors that at least one of the voltage of each cell 102 or the total voltage of the cell group 103 is abnormal (for example, when an overcharge or an imbalance between the cells occurs in the battery pack 10), the control module 106 receives a signal indicating that at least one of the voltage of each cell 102 or the total voltage of the cell group 103 is abnormal and outputs a charging prohibition signal to the charger 30 through the communication module 108. After the charging control module of the charger 30 receives the charging prohibition signal through the communication module 301, the charger 30 outputs the control signal to control the electronic switch 303 to turn off to stop the charging current from flowing to the cell group 103 so that the charging path formed between the battery pack 10 and the charger 30 is cut off.

However, to solve the problem in which the first voltage monitoring module 104 may fail to monitor a voltage because of a fault, the battery pack 10 is provided with a second voltage monitoring module 105. The second voltage monitoring module 105 is configured to monitor the voltage of each cell 102 to detect whether the cells 102 are in an overvoltage state. The second voltage monitoring module 105 is configured to, when the first voltage monitoring module 104 has a fault, function to provide a back-up voltage monitoring. In this manner, the disposed first voltage monitoring module 104 and the disposed second voltage monitoring module 105 can be under dual protection that helps improve the safety of the battery pack 10 during at least one of charging or discharging.

However, in some examples, the second voltage monitoring module 105 may be, for example, a voltage sensor or a voltage detection circuit as long as the second voltage monitoring module 105 can monitor the voltage of a single cell 102. The structural composition of the first voltage monitoring module 104 and the structural composition of the second voltage monitoring module 105 may be the same or different, without limitation herein.

The second voltage monitoring module 105 and the first voltage monitoring module 104 are independent from each other so that the second voltage monitoring module 105 can provide a back-up voltage monitoring to prevent damage to internal or external components of the battery pack 10 when the first voltage monitoring module 104 has a fault. In this manner in which two dependent voltage monitoring modules are used, after one of the voltage monitoring modules has a fault, the other one of the voltage monitoring modules can still be used so that the safety during charging is improved.

When the monitored voltage of at least one of the cells 102 is greater than a first preset voltage, the first voltage monitoring module 104 determines that the cells 102 is in the overvoltage state. When the monitored voltage of at least one of the cells 102 is greater than a second preset voltage, the second voltage monitoring module 105 determines that the cells is in the overvoltage state. The second preset voltage is greater than the first preset voltage. The value of the first preset voltage and the value of the second preset voltage may be set by users according to actual conditions as long as it is ensured that the second preset voltage is greater than the first preset voltage. For example, the first preset voltage is set to 4.2 V, and the second preset voltage is set to 4.3 V.

The second preset voltage is greater than the first preset voltage so that it can be ensured that the second voltage monitoring module 105 functions only when the first voltage monitoring module 104 has a fault, and the situation in which the second voltage monitoring module 105 functions before the first voltage monitoring module so that the voltage monitoring module 104 does not function when the first voltage monitoring module 104 is normal does not occur.

The battery pack 10 further includes a protection module 110 electrically connected to the second voltage monitoring module 105. When the second voltage monitoring module 105 monitors that any one of the cells 102 is in the overvoltage state, the second voltage monitoring module 105 is configured to cut off the charging path formed between the battery pack 10 and the charger 30.

Referring to FIG. 3, in an example, the protection module 110 is connected in series between the second voltage monitoring module 105 and the power module 107. The protection module 110 cuts off the electrical connection between the cell group 103 and the power module 107 when the second voltage monitoring module 105 monitors that any one of the cells 102 is in the overvoltage state.

Specifically, when the second voltage monitoring module 105 monitors that any one of the cells 102 is in the overvoltage state, the protection module 110 cuts off the electrical connection between the cell group 103 and the power module 107, the power module 107 cannot provide electric energy for the control module 106 because of loss of power, and the control module 106 cannot work normally so that the communication module 108 electrically connected to the control module 106 also cannot work normally. At this time, the communication module 108 of the battery pack 10 generates a charging prohibition signal (such as a continuous high level signal), and the battery pack 10 sends the charging prohibition signal to the charger 30 through the communication terminal BD1. After the charger 30 receives the charging prohibition signal, the charger 30 generates a signal for stopping the charging current from flowing to the battery pack. For example, the charging control module 302 of the charger 30 outputs a control signal to control the electronic switch 303 to turn off to stop the charging current from flowing to the cell group 103 to cut off the charging path formed between the battery pack 10 and the charger 30.

Specifically, the protection module 110 includes a control unit 111 and an electronic switch 112. The electronic switch 112 is electrically connected to the power module 107; and the control unit 111 is electrically connected to the electronic switch 112 and the second voltage monitoring module 108. The control unit 111 is configured to, when the second voltage monitoring module 105 monitors that any one of the cells is in the overvoltage state, control the electronic switch 112 to turn on or off to cut off the electrical connection between the cell group 103 and the power module 107.

The electronic switch 112 may be a semiconductor switch such as a bipolar transistor or a field-effect transistor. The electronic switch 112 has a first connecting end a1, a second connecting end b1 and a control end c1. Specifically, an input end of the control unit 111 is electrically connected to an output end of the second voltage monitoring module 105, the output end of the control unit 111 is electrically connected to the control end c1 of the electronic switch 112, and the control unit 111 is configured to control the electronic switch 112 to turn on or off according to the signal of the second voltage monitoring module 105.

The control unit 111 may be, for example, an MCU, an electronic switch, an optical coupler (as shown in FIG. 3) or a level-shift circuit. The control unit 111 may be a combination of software and hardware and includes an MCU, or may be a software program in an MCU. The control unit 111 can control the electronic switch 112 to turn on or off according to the signal of the second voltage monitoring module 105 so that when the signal of the second voltage monitoring module 105 monitors that any one of the cells 102 is in the overvoltage state, the control unit 111 can control the electronic switch 112 to turn on or off to cut off the electrical connection between the cell group 103 and the power module 107.

In an example, the control unit 111 is an optical coupler. When the second voltage monitoring module 105 monitors that any one of the cells 102 reaches an overvoltage condition, the second voltage monitoring module 105 sends an electrical signal to an input end of the optical coupler. That is, the second voltage monitoring module 105 applies an electrical signal to the input end of the optical coupler to cause a light source (such as a light-emitting diode) in the optical coupler to emit light. After the light illuminates a light receptor in the optical coupler 110 and packaged with the light source, a photocurrent is generated due to the photoelectric effect, current is introduced from the output end of the light receptor. After the current is converted to voltage and the converted voltage is applied to the control end of the electronic switch 112, the electronic switch 112 is controlled to turn on or off to cut off the electrical connection between the cell group 103 and the power module 107.

In an optional solution, the control unit 111 of the protection module 110 controls the electronic switch 112 to turn off to cut off the electrical connection between the cell group 103 and the power module 107 when the second voltage monitoring module 105 monitors that any one of the cells 102 is in the overvoltage state. The electronic switch 112 is electrically connected between the cell group 103 and the power module 107, the first connecting end a1 of the electronic switch 112 is electrically connected to the anode of the cell group 103, the second connecting end b1 of the electronic switch 112 is electrically connected to the power module, and the control unit 111 is electrically connected to the control end c1 of the electronic switch 112 and the second voltage monitoring module 108. The control unit 111 controls the electronic switch 112 to turn off to cut off the electrical connection between the cell group 103 and the power module 107 when the second voltage monitoring module 105 monitors that any one of the cells 103 is in the overvoltage state. For example, the control unit 111 is an MCU.

In another optional solution illustrated in FIG. 3, the protection module 110 includes the control unit 111 and the electronic switch 112 and further includes a fuse 113. The fuse 113 is electrically connected to the cell group 103. The control unit 111 of the protection module 110 controls the electronic switch 112 to turn on to cut off the electrical connection between the cell group 103 and the power module 107 when the second voltage monitoring module 105 monitors that any one of the cells 102 is in the overvoltage state. For example, the control unit 111 is an MCU or an optical coupler.

Specifically, the fuse 113 is electrically connected between the cell group 103 and the power module 107. Optionally, one end of the fuse 113 is electrically connected to the anode of the cell group 103, and the other end of the fuse 113 is electrically connected to the power module 107.

The electronic switch 112, the fuse 113 and the cell group 403 are connected in series. Specifically, the first connecting end a1 of the electronic switch 112, the second connecting end b1 of the electronic switch 112, the fuse 113 and the cell group 103 are connected in series to constitute a loop in series. The first connecting end a1 of the electronic switch 112 and the fuse 113 are electrically connected to the same end of the power module 107, and the second connecting end b1 of the electronic switch 112 is electrically connected to the cathode or the ground end of the cell group 103.

The control unit 111 is electrically connected to the control end c1 of the electronic switch 112 and the second voltage monitoring module 105. The control unit 111 is configured to, when the second voltage monitoring module 105 monitors that any one of the cells 102 is in the overvoltage state, control the electronic switch 112 to turn on to short the fuse 113 to blow the fuse 113.

Optionally, the value of the current of the limiting breaking capacity of the fuse 113 ranges from 100 mA to 200 mA.

The following describes the specific working process of the protection module 110 of FIG. 3: When the second voltage monitoring module 105 monitors that any one of the cells 102 reaches the overvoltage condition, the control unit 111 recognizes or receives an overcharge signal, the control unit 111 outputs an signal to the electronic switch 112 to control the electronic switch 112 to turn on, and the fuse 113 is directly connected to the cell group to be shorted so that the fuse 113 is blown and the electrical connection between the cell group 103 and the power module 107 is cut off. In this manner, the power module 107 loses power and cannot provide electrical energy to the control module 106, the control module 106 cannot work normally, the communication module 108 electrically connected to the control module 106 cannot work normally, and the communication module 108 generates a charging prohibition signal (such as a continuous high level signal). After the charging prohibition signal is received by the charger 30, the charger 30 generates a signal for stopping the charging current flowing to the battery pack, for example, the charging control module 302 outputs a control signal to control the electronic switch 303 to turn off to stop the charging current from flowing to the cell group 103 to cut off the charging path formed between the battery pack 10 and the charger 30.

Figure 4:
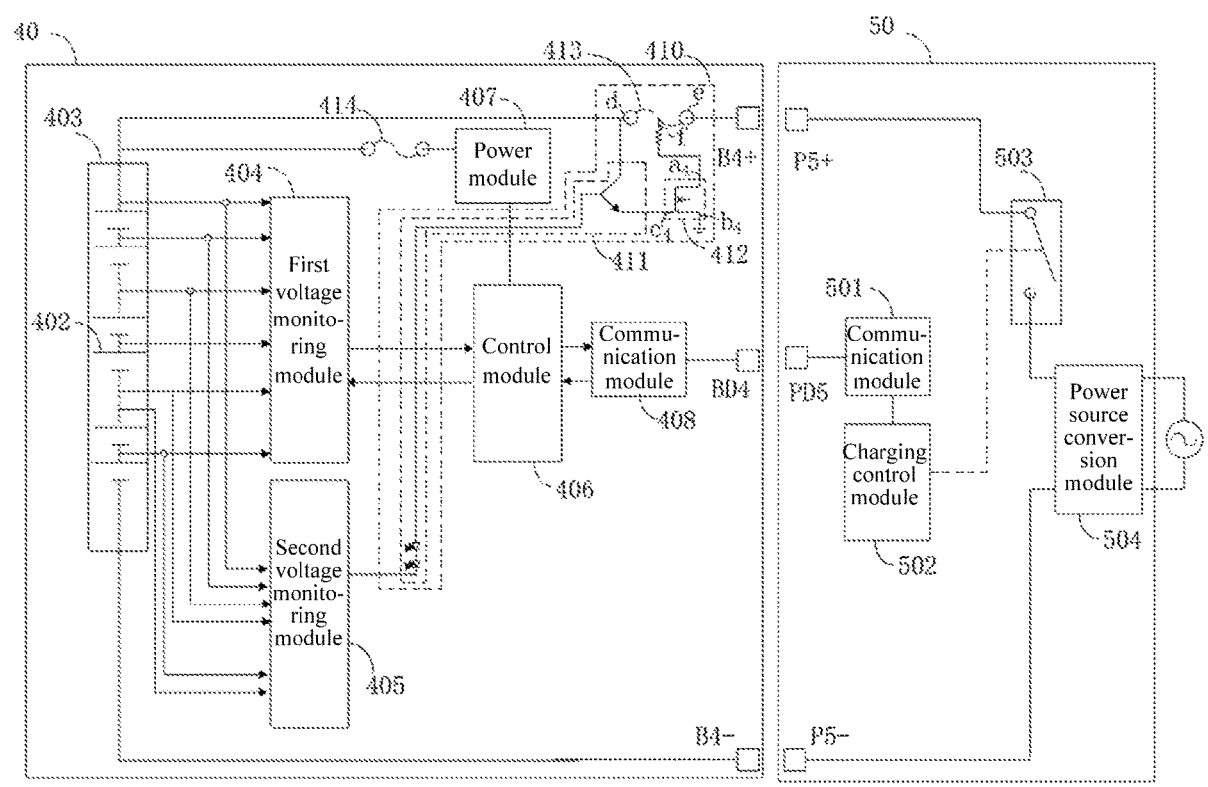
FIG. 4 illustrates circuit diagrams of the inside of a battery pack and the inside of a charger according to an example.

FIG. 4 is an example of the battery pack 40 and the charger 50. The battery pack 40 includes a housing, a positive terminal B4+, a negative terminal B4−, cells 402, a cell group 403 constituted by the cells electrically connected to each other, a first voltage monitoring module 404, a second voltage monitoring module 405, the control module 406 and a protection module 410. The charger 50 includes a charging positive terminal P5+, a charging negative terminal P5−, a communication module 501, a charging control module 502, a charging switch 503 and a power source conversion module 504.

The above components of the battery pack 40 of this example are the same as or similar to the corresponding components of the battery pack 10 of the example shown by FIG. 3. The components of the charger 50 of this example are the same as the components of the charger 30 of this example shown by FIG. 3, no more redundant descriptions herein. The difference is that the protection module 410 of the battery pack 40 of this example shown by FIG. 4 is different from the protection module 110 of the battery pack 10 of the example shown by FIG. 3.

Referring to FIG. 4, the protection module 410 is connected in series between the second voltage monitoring module 405 and the positive terminal B4+ or cathode electron B4− of the battery pack 40. The protection module 410 is configured to, when the second voltage monitoring module 105 monitors that any one of the cells 402 is in the overvoltage state, cut off the electrical connection between the cell group 403 and one of the positive terminal B4+ and the cathode electron B4− so that the charging path of the battery pack 40 is cut off.

Specifically, the protection module 410 includes a control unit 411 and an electronic switch 412. The electronic switch 412 is electrically connected to the positive terminal B4+ or the negative terminal B4− of the battery pack 40. The control unit 111 is electrically connected to the electronic switch 112 and the second voltage monitoring module 406.

The control unit 411 is electrically connected to the electronic switch 412 and the second voltage monitoring module 405. The control unit 411 is configured, when the second voltage monitoring module 405 monitors that any one of the cells 402 is in the overvoltage state, to control the electronic switch 412 to turn on or off to cut off the electrical connection between the cell group 403, and the positive terminal B4+ or the negative terminal B4− to cut off the charging path formed between the battery pack 40 and the charger 50.

The electronic switch 412 may be a semiconductor switch such as a bipolar transistor or a field-effect transistor. The electronic switch 412 has a first connecting end a4, a second connecting end b4 and a control end c4. An input end of the control unit 411 is electrically connected to an output end of the second voltage monitoring module 405. An output end of the control unit 411 is electrically connected to the control end of the electronic switch 412. The control unit 411 is configured to control to turn on or off according to the signal of the second voltage monitoring module 105.

The control unit 411 may be a circuit such as an electronic switch, an optical coupler (as shown in FIG. 4) or a level-shift circuit. The control unit 411 may be a combination of software and hardware and includes an MCU or may be a software program in an MCU. The control unit 411 can control the electronic switch 411 to turn on or off according to the signal of the second voltage monitoring module 405 so that when the signal of the second voltage monitoring module 405 monitors that any one of the cells 402 is in the overvoltage state, the control unit 411 can cut off the electrical connection between the cell group 403, and the positive terminal B4+ or the negative terminal B4− of the battery pack 40.

In some examples, the control unit 411 of the protection module 410 is an optical coupler. When the second voltage monitoring module 405 monitors that any one of the cells 402 reaches an overvoltage condition, the second voltage monitoring module 405 sends an electrical signal to an input end of the optical coupler. That is, the second voltage monitoring module 405 applies an electrical signal to the input end of the optical coupler to cause a light source (such as a light-emitting diode) in the optical coupler to emit light. After the light illuminates a light receptor in the optical coupler 410 and packaged with the light source, a photocurrent is generated due to the photoelectric effect, current is introduced from the output end of the light receptor. After the current is converted to voltage and the converted voltage is applied to the control end of the electronic switch 412, the electronic switch 412 is controlled to turn on or off to cut off the electrical connection between the cell group 403 and the positive terminal B4+ of the battery pack 40 or between the cell group 403 and the negative terminal B4− of the battery pack 40.

In an optional solution, the control unit 411 of the protection module 410 controls the electronic switch 412 to turn off to cut off the electrical connection between the cell group 403 and the power module 407 when the second voltage monitoring module 405 monitors that any one of the cells 402 is in the overvoltage state. The electronic switch 412 is electrically connected between the cell group 403 and the power source terminals. Specifically, the first connecting end a4 of the electronic switch 412 is electrically connected to the anode or the cathode of the cell group 403, the second connecting end b4 of the electronic switch 412 is electrically connected to the positive terminal B4+ or the negative terminal B4− of the battery pack 40, the control unit 411 is electrically connected to the control end c4 of the electronic switch 412 and the second voltage monitoring module 408, and the control unit 411 controls the electronic switch 412 to turn off to cut off the electrical connection between the cell group 403 and the positive terminal B4+ when the second voltage monitoring module 405 monitors that any one of the cells 402 is in the overvoltage state.

In another optional solution illustrated in FIG. 4, the protection module 410 includes the control unit 411 and the electronic switch 412, and further includes a fuse 413. The fuse 413 is electrically connected to the cell group 403. The control unit 411 of the protection module 410 controls the electronic switch 412 to turn on to cut off the electrical connection between the cell group 403 and the power module 407 when the second voltage monitoring module 405 monitors that any one of the cells 402 is in the overvoltage state. For example, the control unit 411 is an MCU or an optical coupler.

In an optional solution, the fuse 413 is a three-end fuse having three connecting ends. The three connecting ends are a first connecting end d, a second connecting end e and a third connecting end f separately. The three-end fuse is blown when the current between the first connecting end d and the third connecting end f reaches the breaking capability of the three-end fuse so that the first connecting end d and the second connecting end e are disconnected from each other to cut off the conductive path.

The electronic switch 411, the fuse 413 and the cell group 403 are connected in series. Specifically, the first connecting end a4 of the electronic switch 412, the second connecting end b of the electronic switch 412, the first connecting end d of the fuse 413, the third connecting end f of the fuse 413 and the cell group 403 are connected in series to constitute a loop. The control unit 411 is electrically connected to the control end c4 of the electronic switch 412 and the second voltage monitoring module 405. The control unit 411 is configured to, when the second voltage monitoring module 405 monitors that any one of the cells 402 is in the overvoltage state, control the electronic switch 412 to turn on to short the fuse 413 to blow the fuse 413.

In an example, the protection module 410 is connected in series between the second voltage monitoring module 405 and the positive terminal B4+ of the battery pack 40. The protection module 410 cuts off the electrical connection between the cell group 403 and the positive terminal B4+ of the battery pack 40 to cut off the charging path of the battery pack 40 when the second voltage monitoring module 405 monitors that any one of the cells 402 is in the overvoltage state.

Specifically, the first connecting end d of the fuse 412 is electrically connected to the anode of the cell group 403, the second connecting end e of the fuse 412 is electrically connected to the positive terminal B4+ of the battery pack 40, the third connecting end f of the fuse is electrically connected to the first connecting end a4 of the electronic switch 412, the second connecting end b4 of the electronic switch 412 is electrically connected to the cathode or the ground end of the cell group 403, and the control end c4 of the electronic switch 412 is electrically connected to the control unit 411. The electronic switch 412, the fuse 413 and the cell group 403 are connected in series.

The following describes the specific working process of the protection module 410 of FIG. 4: When the second voltage monitoring module 405 monitors that any one of the cells 402 reaches the overvoltage condition, the control unit 411 recognizes or receives an overcharge signal of the second voltage monitoring module 405, the control unit 411 outputs an signal to the electronic switch 412 to control the electronic switch 412 to turn on, and the fuse 113 is blown so that the electrical connection between the cell group 403 and the positive terminal B4 of the battery pack 40 is cut off, and the charging path of the battery pack 40 is cut off.

In another example, the protection module 410 is connected between the second voltage monitoring module 405 and the negative terminal B4− of the battery pack 40. The protection module 410 cuts off the electrically connection between the cell group 403 and the negative terminal B4− of the battery pack 40 to cut off the charging path of the battery pack 40 when the second voltage monitoring module 405 monitors that any one of the cells 402 is in the overvoltage state. The fuse 412 is electrically connected between the cathode of the cell group 403 and the negative terminal B4 of the battery pack 40. The electronic switch 412, the fuse 413 and the cell group 403 are connected in series.

Specifically, the first connecting end d of the fuse 413 is electrically connected to the cathode of the cell group 403, the second connecting end e of the fuse 413 is electrically connected to the negative terminal B4− of the battery pack 40, the third connecting end f of the fuse 413 is electrically connected to the first connecting end a4 of the electronic switch 412, the second connecting end b4 of the electronic switch 412 is electrically connected to the cathode or the ground end of the cell group 403, and the control end c4 of the electronic switch 412 is electrically connected to the control unit 411. The electronic switch 412, the fuse 413 and the cell group 403 are connected in series.

A three-end fuse is adopted in the preceding example. The fuse 413 can be blown when smaller short-circuit current passes through the fuse 413 so that the following situation is prevented: a traditional two-end fuse needs a larger short-circuit current to be blown when adopted. As a result, the electronic switch 412 conducts a larger current, has a greater fever and energy loss and is even damaged.

Optionally, the battery pack 40 further includes a power module 407 and a control module 406. The power module 407 is electrically connected to the cell group 403, and is configured to convert the electrical energy of the cell group 403 to the electrical energy for the control module 406 to use.

Optionally, the battery pack 40 further includes a communication module 408 electrically connected to the control module 406 of the battery pack 40. The communication module 408 can be in communicative connection with the communication module 501 of the charger 50 to transmit signals. In some examples, the communication module 408 is a communication circuit that can be in a wired communicative connection with the communication module 501 of the charger 50. For example, the battery pack 40 is provided with a communication terminal BD4 electrically connected to the communication module 408, the charger 50 is correspondingly provided with a charging communication terminal PD5 connectable to the communication terminal BD4, and a communicative connection is established between the battery pack 40 and the communication module 501 of the charger 50 through the communication module BD4 of the battery pack 40 and the charging communication terminal PD5 of the charger 50. In another example, the communication module 408 may be a wireless communication module and can be in a wireless communicative connection with the communication module 501 of the charger 50.

Optionally, the battery pack 40 further includes a second fuse 414. The second fuse 414 is electrically connected between the cell group 403 and the power module 407 to provide extra protection.

This example is just an exemplary description, and does not limit the content of the disclosure. In another example, the battery pack may further include both the protection module 110 and the protection module to provide a triple protection and higher safety performance and a higher reliability.

In this example, when the first voltage monitoring module (104, or 404) has a fault, the second voltage monitoring module (105, or 405) is configured to provide back-up protection so that the safety during charging and the reliability of charging protection are improved. The electronic switch (112, or 412) turns on to short the fuse (113, or 413) and the cell group such that the protection module (110, or 410) of the preceding examples cuts off the charging path of the battery pack 40 when the second voltage monitoring module (105, or 405) monitors that any one of the cells reaches the overvoltage condition so that fewer elements are used, the circuit is simple, and safety and reliability are achieved. Particularly, the control unit (111, or 411) adopts an optical coupler so that the isolation performance is good, the reaction speed is quick, the transmission efficiency is high, the capacity to resist common mode interference is strong, interference is preferably suppressed, and noise is eliminated.

Figure 5:
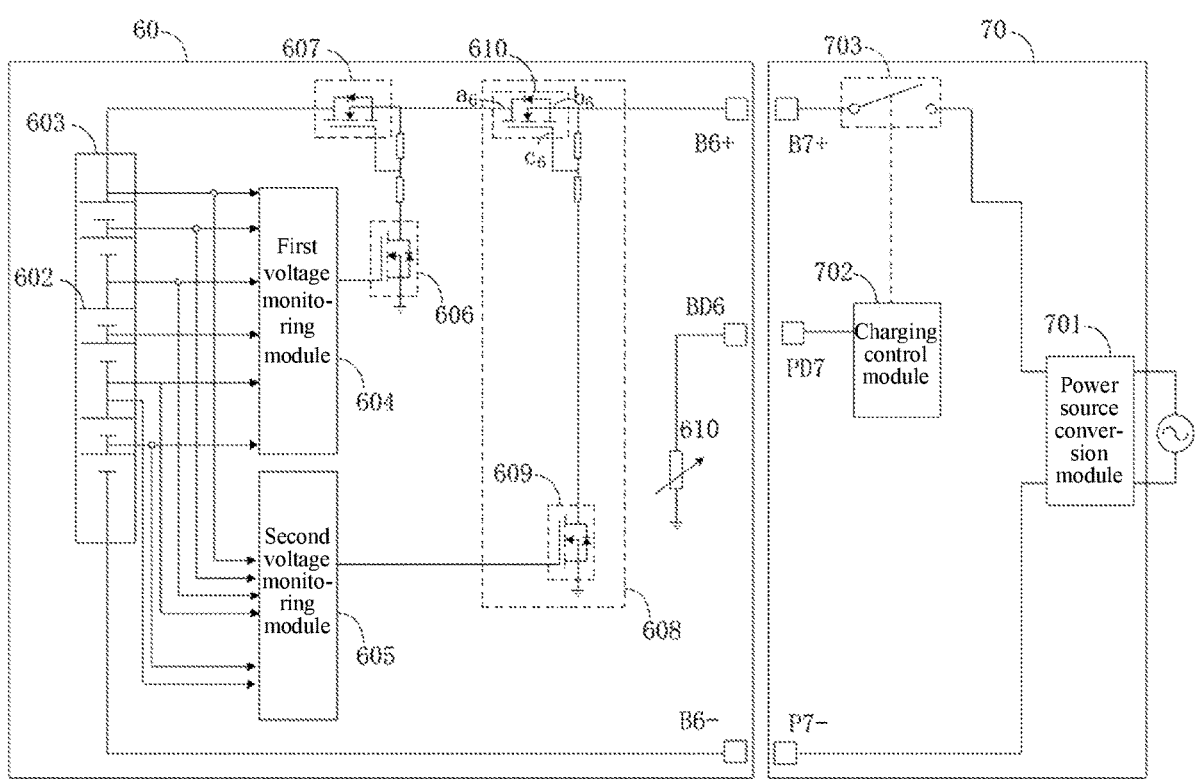
FIG. 5 illustrates circuit diagrams of the inside of a battery pack and the inside of a charger according to an example.

FIG. 5 illustrates an example of the battery pack 60 and the charger 70. The battery pack 60 includes a positive terminal B6+, a negative terminal B6−, cells 602, a cell group 603 constituted by the cells 602 electrically connected to each other, a first voltage monitoring module 604, a second voltage monitoring module 605, a control module 606, an electronic switch 607 and a protection module 608. The charger 70 includes a charging positive terminal P7+, a charging negative terminal P7−, a power source conversion module 701, a charging control module 702 and a charging switch 703. The components of the battery pack 60 of this example are the same as the corresponding components of battery pack 10 and the battery pack 40 of the preceding examples, and the components above of the charger 70 are the same or similar to the corresponding components of the charger 30 and the charger 50 of the preceding examples, no more redundant descriptions herein. The main difference is that the protection module 608 shown by FIG. 5, the battery pack 10 shown by FIG. 3 and the battery pack 40 shown by FIG. 4 have different protection modules.

Referring to FIG. 5, the protection module 608 is connected in series between the second voltage monitoring module 605 and the power source terminals of the battery pack 60. The protection module 608 is configured to, when the second voltage monitoring module 605 monitors that any one of the cells 602 is in the overvoltage state, cut off the electrical connection between the cell group 603 and the power source terminals to cut off the charging path of the battery pack 60. The power source terminals of the battery pack 40 include a positive terminal B4+ and a negative terminal B−.

Optionally, the protection module 608 is connected in series between the second voltage monitoring module 605 and the positive terminal B6+ of the battery pack 60. The protection module 608 cuts off the electrical connection between the cell group 603 and the positive terminal B6+ of the battery pack 60 to cut off the charging path of the battery pack 60 when the second voltage monitoring module 605 monitors that any one of the cells 602 is in the overvoltage state.

Optionally, the protection module 608 is connected in series between the second voltage monitoring module 605 and the negative terminal B6− of the battery pack 60. The protection module 608 cuts off the electrical connection between the cell group 603 and the negative terminal B6− of the battery pack 60 to cut off the charging path of the battery pack 60 when the second voltage monitoring module 605 monitors that any one of the cells 602 is in the overvoltage state.

Specifically, the protection module 608 includes a control unit 609 and an electronic switch 610. The electronic switch 610 is electrically connected to the positive terminal B6+ or the negative terminal B6− of the battery pack 60. The control unit 609 is electrically connected to the electronic switch 610 or the second voltage monitoring module 605. The control unit 609 is configured to, when the second voltage monitoring module 605 monitors that any one of the cells 602 is in the overvoltage state, control the electronic switch 612 to turn off to cut off the electrical connection between the cell group 603 and the positive terminal B6+ of the battery pack 60 or the electrical connection between the cell group 603 and the negative terminal B6− of the battery pack 60, so as to cut off the charging path of the battery pack 60.

The electronic switch 610 may be a semiconductor switch such as a bipolar transistor or a field-effect transistor. The electronic switch 610 has a first connecting end a6, a second connecting end b6 and a control end c6. An input end of the control unit 610 is electrically connected to an output end of the second voltage monitoring module 605, the output end of the control unit 611 is directly or indirectly electrically connected to the control end c6 of the electronic switch 610, and the control unit 609 is configured to control the electronic switch 610 to turn on or off according to the signal of the second voltage monitoring module 605. The control unit 608 may be a circuit such as an electronic switch, an optical coupler or a level-shift circuit. The control unit 608 may be a combination of software and hardware and includes an MCU or may be a software program in an MCU. The control unit 111 can control the electronic switch 610 to turn on or off according to the signal of the second voltage monitoring module 605 so that when the signal of the second voltage monitoring module 605 monitors that any one of the cells 602 is in the overvoltage state, the control unit 608 can cut off the electrical connection between the cell group 603 and the positive terminal B6+ of the battery pack 60 or the electrical connection between the cell group 603 and the negative terminal B6− of the battery pack 60. In this example, the control unit 609 is an electronic switch such as a field-effect transistor.

Referring to FIG. 5, following is the specific working process of the protection module 608: when the second voltage monitoring module 605 monitors that any one of the cells 602 reaches the overvoltage condition, the control unit 608 recognizes or receives an overcharge signal of the second voltage monitoring module 605, the control unit 608 outputs an signal to the electronic switch 609 to control the electronic switch 609 to turn off so that the electrical connection between the cell group 603 and the positive terminal B6+ of the battery pack 60, or the electrical connection between the cell group 603 and the negative terminal B6− of the battery pack 60 is cut off, and the charging path of the battery pack 60 is cut off.

Optionally, the battery pack 60 further includes a temperature sensor 610 configured to detect the temperature inside the battery pack 60. Optionally, the temperature sensor 610 may be disposed nearby the cells 602 and configured to detect the temperature of the cells 602. The battery pack 60 further includes a communication terminal BD6 electrically connected to the temperature sensor 610. The communication terminal BD6 is configured to be electrically connected to the charging communication terminal PD7 of the charger 70. The charging communication terminal PD7 is electrically connected to the charging control module 702 of the charger 70. The charging control module 702 of the charger 70 can recognize the detection signal of the temperature sensor 610 inside the battery pack 60 through the communication terminal PD7 and the communication terminal BD6 to determine the temperature of the battery pack 60. When the charging control module 702 determines that the temperature of the battery pack 60 is too high or too low, the charging switch 703 is controlled to turn off such that the charging control module 702 can cut off the charging current flowing to the battery pack 60 so that protection is conducted when the temperature is too high or too low.

Referring to FIG. 5, when the first voltage monitoring module 406 has a fault, the second voltage monitoring module 605 arranged in the battery pack 60 can provided back-up protection so that the safety during charging and the reliability of charging protection of the battery pack 60 are improved. Referring to FIG. 5, the electronic switch 609 is controlled to turn off to cut off the charging path of the battery pack 60 when the second voltage monitoring module 605 monitors that any one of the cells reaches the overvoltage condition such that the protection module 608 of the battery pack 60 directly cuts off the electrical connection between the cell group 603 and the positive terminal B6+ of the battery pack 60, or the electrical connection between the cell group 603 and the negative terminal B6− of the battery pack 60 so that fewer elements are used, the circuit is designed to be simple, and safety and reliability are achieved. In addition, in this example, the control module 606 may be an electronic switch such as a field-effect transistor. The control module 606 of this example has a lower cost and a simpler control method compared with the solution adopting an MCU.

Figure 6:
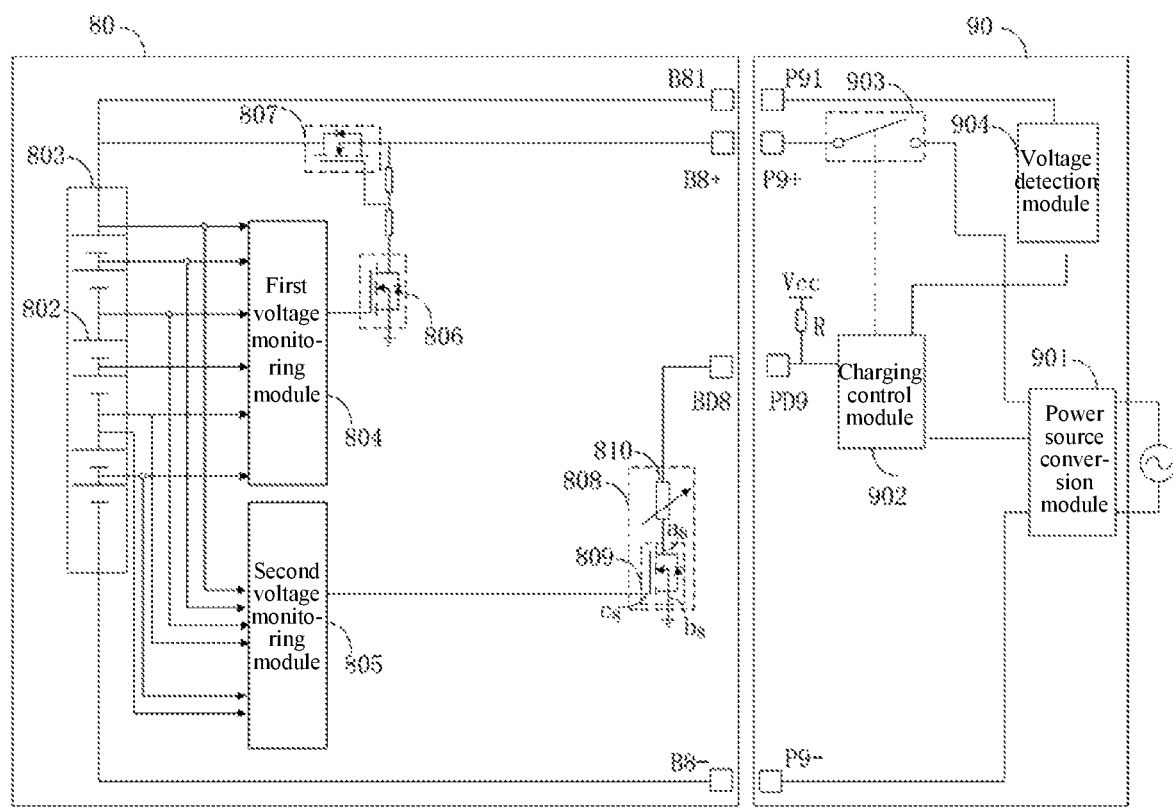
FIG. 6 illustrates circuit diagrams of the inside of a battery pack and the inside of a charger according to an example.

FIG. 6 is an example of the battery pack 80 and the charger 90. The battery pack 80 includes a positive terminal B8+, a negative terminal B8−, cells 802, and a cell group 803 constituted by the cells 802 electrically connected to each other, a first voltage monitoring module 804, a second voltage monitoring module 805, a control module 806, an electronic switch 807 and a protection module 808. The charger 90 includes a charging positive terminal P9+, a charging negative terminal P9−, a power source conversion module 901, a charging control module 902 and a charging switch 903. The components of the battery pack 80 are the same as or similar to the corresponding components of the battery pack (10, or 40, or 60) of the preceding examples, and the components above of the charger 90 are the same as or similar to the corresponding components of the charger (30, or 50, or 70) of the preceding examples, no more redundant descriptions herein. The main difference is that the protection module 808 shown by FIG. 6 and the protection module 608 of the battery pack 60 shown by FIG. 5 are different.

In addition, the battery pack 80 shown by FIG. 6 further includes a communication terminal BD8. The communication terminal BD8 is configured to at least transmit a signal of the battery pack 80 to the charger 90 or the electric tool 20. The communication terminal BD8 is connectable to the charging communication terminal PD9 of the charger 90, and the charging communication terminal PD9 of the charger 90 is electrically connected to the charging control module 902 of the charger 90. A communicative connection can be established between the battery pack 80 and the charger 90 through the charging communication terminal PD9 of the charger 90 and the communication terminal BD8 of the battery pack 80.

Referring to FIG. 6, the protection module 808 is connected in series between the second voltage monitoring module 805 and the communication terminal BD8. The second protection module 808 outputs a signal to the charger 90 through the communication terminal BD8 when the second voltage monitoring module 805 monitors that any one of the cells 802 is in the overvoltage state so that the charger 90 prevents the charging current from flowing to the battery pack 80 to cut off the charging path of the battery pack 80.

In an example, the protection module 808 includes an electronic switch 809 and a temperature sensor 810. The electronic switch 809 is electrically connected to the second voltage monitoring module 805. Specifically, the electronic switch 809 includes a first connecting end a8, a second connecting end b8 and a control end c8. The first connecting end a8 is connected to the temperature sensor 810. The second connecting end b8 is connected to the ground, and the control end c8 is electrically connected to the second voltage monitoring module 805. The electronic switch 809 can switch between the power-off state to the power-on state according to a signal of the second voltage monitoring module 805. Specifically, when the second voltage monitoring module 805 monitors that any one of the cells 802 is in the overvoltage state, the electronic switch 809 turns off.

The temperature sensor 810 is connected in series between the electronic switch 809 and the communication terminal BD8. The temperature sensor 809 is configured to detect the temperature inside the battery pack 80. Specifically, the temperature sensor 809 can be disposed nearby the cells 802. The temperature sensor 809 is configured to detect the temperature of the cells 802. The temperature sensor 809 is electrically connected to the communication terminal BD8 of the battery pack 80.

The control module 902 of the charger 90 can receive the detection signal of the temperature sensor 809 in the battery pack 80 to determine the temperature of the battery pack 80 through the charging communication terminal PD9 and the communication terminal BD9 of the charger 90. When the control module 902 determines that the temperature of the battery pack 80 is too low or too high, the charging control module 902 controls the charging switch 903 to turn off such that the charging control module 902 can cut off the charging current from flowing to the battery pack 80 so that protection is conducted when the temperature is too low or too high.

In this example, the electronic switch 809 cuts off the conductive path of the temperature sensor 810 to disable the temperature sensor 810 to work normally, and the communication terminal BD8 of the battery pack 80 and the charging communication terminal PD9 of the charger 90 generate a charging prohibition signal when the second monitoring module 805 monitors that any one of the cells 802 is in the overvoltage state. After the charging control module 902 of the charger 90 receives the charging prohibition signal, the charging control module 902 outputs a control signal to control the charging switch 903 to turn off to stop the charging current from flowing to the battery pack 80 so that the charging path of the battery pack 80 is cut off. Optionally, the temperature sensor 810 may adopts a thermistor, especially an NTC thermistor.

In some examples, the charger 90 is provided with a pull-up resistor R, and a pull-up power source Vcc (such as 3.3 V) electrically connected to the pull-up resistor R. The other end of the pull-up resistor R is electrically connected to the charging communication terminal PD9 of the charger 90. When the battery pack 80 is mounted on the charger 90, the communication terminal BD8 of the battery pack 80 contacts the charging communication terminal PD9 of the charger.

When the second voltage detection module 805 does not monitor that any one of the cells 802 is overcharged, the electronic switch 809 keeps being on, one end of the temperature sensor 810 in the battery pack 80 is connected to the ground through the electronic switch 809, and the pull-up power source Vcc provides power to the temperature sensor 810 through the pull-up resistor R. Because the pull-up resistor R divides the pressure, a pressure signal is generated on the communication terminal BD8 and the charging communication terminal PD9 to indicate the resistance value of the temperature sensor 810, the voltage valve of the voltage signal is less than the voltage value of the pull-up power source Vcc, and the charging control module 902 of the charger 90 can determine, according to the voltage signal, that the second voltage detection module 805 does not monitor that any one of the cells 802 is overcharged so that the charging control module 902 does not control the charging switch 903 to turn off to stop the charging current of the battery pack 80.

When the second voltage detection module 805 detects that one of the cells 802 is in the overvoltage state, the second voltage detection module 805 outputs an electrical signal to the electronic switch 809 to switch the electronic switch 809 to turn off so that the conductive path of the temperature sensor 810 in the battery pack 80 is cut off by the electronic switch 809, and the pull-up power source Vcc cannot provide electrical energy to the temperature sensor 810 through the pull-up resistor R. Therefore, the voltage value of the voltage signal produced on the communication terminal BD8 and the charging communication terminal PD9 is substantially equal to the voltage value of the pull-up power source Vcc, the voltage signal is the charging prohibition signal, and the charging control module 902 of the charger 90 determines according to the voltage signal that the second voltage detection module 805 monitors that a cell 802 is in the overvoltage state so that the charging control module 902 controls the charging switch 903 to turn off to stop the charging current from flowing to the battery pack 80.

In this example, when the first voltage monitoring module 804 has a fault, the second voltage monitoring module 805 is configured to provide back-up protection so that safety performance during charging and reliability of charging protection of the battery pack are improved. The protection module 808 of this example includes a temperature sensor 810. The temperature sensor 810 detects the temperature of battery pack 80 when working normally. When the second voltage monitoring module 605 monitors that any one of the cells reaches the overvoltage condition, the temperature sensor 810 can be used for overvoltage protection. That is, the temperature sensor 810 of this example can implement protection when the temperature is too high or too low, and an overvoltage protection so that the number of the elements and the costs can be reduced.

To further improve safety performance during charging, the charger is provided with a voltage detection module 904. The voltage detection module 904 is electrically connected to the charging control module 902, and is configured to detect the voltage of the battery pack 80. The charging control module 902 is electrically connected to the power source conversion module 901, and can control the output voltage of the power source conversion module 901 to improve the accuracy of the charging voltage according to the pressure of the battery pack 90 detected by the voltage detection module 904.

Since each of the existing charger 80 and the existing battery pack 90 has just one group of the power source terminals, the voltage detection module 904 is typically configured to be electrically connected to the charging positive terminal P9+ of the charger 80 so that the voltage detection module 904 can be electrically connected to the positive terminal B8+ of the battery pack 90 to detect the voltage when the battery pack 80 is connected to the charger 80. Since the charging positive terminal P9+ of the battery pack 90 is connected to other electrical elements used for charging inside the battery pack 90, accuracy of detection of the voltage detection module 904 is affected so that safety during charging and accuracy of the charging voltage are adversely affected.

To solve the problem, referring to FIG. 6, the battery pack 80 is further provided with a detection terminal B81. The detection terminal B81 is electrically connected to the anode of the cell group 803, the charger 90 is correspondingly provided with a charging detection terminal P91, and the charging detection terminal P91 is electrically connected to the voltage detection module 904 of the charger 90. When the battery pack 90 is mounted to the charger 90, the electrical connection between the detection terminal B81 of the battery pack 80 and the charging detection terminal P91 of the charger 90 can be achieved to detect the voltage. Therefore, the voltage detection module 904 can directly detect the voltage of the cell group 803 in the battery pack 80 to detect the voltage more accurately to improve the accuracy of the charging voltage of the charger 90.

Specifically, when the battery pack 80 is connected to the charger 90, the charging detection terminal P9+ of the charger 90 is electrically connected to the positive terminal B8+ of the battery pack 80 to transmit electrical power, and the charging detection terminal P91 of the charger 90 is electrically connected to the detection terminal B81 of the battery pack 80. At this time, the voltage detection module 904 electrically connected to the charging detection terminal P91 of the charger 90 can detect the total voltage of the cell group 103 and sends a voltage message to the charging control module 902, and the charging control module 902 controls the output voltage of the voltage conversion module 901 to improve the accuracy of the charging voltage of the charger 90 according to the received total voltage of the cell group 103.

The disclosure further discloses a charging assembly. The charging assembly includes the battery pack (10, or 40, or 60, or 80) and the charger (30, or 50, or 70, or 90) of the preceding examples. The details are not described here. The battery pack is detachably mounted to the charger.

Basic principles, main features and advantages of the disclosure are shown and described above. It is to be understood by those skilled in the art that the disclosure is not limited by the preceding examples, and all solutions obtained by equivalent replacement or variation fall within the scope of the disclosure.

In view of the foregoing, it will be appreciated that this disclosure provides a battery pack. The battery pack is under dual protection that helps improve safety performance during charging.

What is claimed is:
1. A battery pack detachably connectable to an electric tool or a charger and comprising:
 a housing;
 a cell group comprising a plurality of cells electrically connected to each other, wherein the cell group is disposed in the housing;
 a first voltage monitoring module configured to monitor at least one of a voltage of each of the plurality of the cells or a total voltage of the cell group;
 a control module electrically connected to the first voltage monitoring module and configured to control a charging process of the cell group;
 a second voltage monitoring module configured to monitor the voltage of each of the plurality of the cells to detect whether the plurality of the cells are in an overvoltage state; and
 a protection module electrically connected to the second voltage monitoring module and is electrically connected in series between the cell group and a terminal of the battery pack, the protection module configured to, when the second voltage monitoring module monitors that any one of the plurality of the cells is in the overvoltage state, cut off a charging path formed between the battery pack and the charger,
 wherein the battery pack further comprises a communication terminal configured to at least transmit a signal of the battery pack to the charger or the electric tool, the protection module is connected in series between the second voltage monitoring module and the communication terminal, and the protection module is configured to, when the second voltage monitoring module monitors that any one of the plurality of the cells is in the overvoltage state, send the signal to the charger through the communication terminal to generate, in the charger, a signal for stopping a charging current from flowing to the battery pack.

2. A charging assembly, comprising:
 a battery pack; and
 a charger;
 wherein the battery pack comprises:
  a housing;
  a cell group comprising a plurality of cells electrically connected to each other, wherein the cell group is disposed in the housing;
  a first voltage monitoring module configured to monitor at least one of a voltage of each of the plurality of the cells or a total voltage of the cell group;

a control module electrically connected to the first voltage monitoring module and configured to control a charging process of the cell group;

a second voltage monitoring module configured to monitor the voltage of each of the plurality of the cells to detect whether the plurality of the cells are in an overvoltage state;

a protection module electrically connected to the second voltage monitoring module and electrically connected in series between the cell group and a terminal of the battery pack, the protection module configured to, when the second voltage monitoring module monitors that any one of the plurality of the cells is in the overvoltage state, cut off a charging path formed between the battery pack and the charger and a communication terminal configured to at least transmit a signal of the battery pack to the charger or an electric tool; and the protection module is connected in series between the second voltage monitoring module and the communication terminal and configured to, when the second voltage monitoring module monitors that any one of the plurality of the cells is in the overvoltage state so that the charger stops a charging current from flowing to the battery pack, output a charging prohibition signal to the charger through the communication terminal.

3. The charging assembly of claim 2, wherein the protection module comprises an electronic switch electrically connected to the second voltage monitoring module and a temperature sensor, connected in series between the electronic switch and the communication terminal, and the electronic switch is configured to, when the second monitoring module monitors that any one of the plurality of the cells is in the overvoltage state, cut off a conductive path of the temperature sensor.

4. The charging assembly of claim 2, wherein the charger comprises a charging communication terminal connectable to the communication terminal of the battery pack to receive the charging prohibition signal, a charging control module electrically connected to the charging communication terminal, and a charging switch electrically connected to the charging control module, and the charging control module is configured to output a control signal according to the received charging prohibition signal to turn off the charging switch so that the charger stops the charging current from flowing to the battery pack.

* * * * *